3,183,222
PROCESS OF PREPARING POLYVINYLCHLORIDE AND MIXED POLYMERIZATES OF VINYLCHLORIDE

Werner Trautvetter, Spich, Troisdorf, Germany, assignor to Dynamit Nobel Aktiengesellschaft, Troisdorf, Bezirk Cologne, Germany, a corporation of Germany
No Drawing. Filed Sept. 20, 1961, Ser. No. 139,367
Claims priority, application Germany, Dec. 24, 1960, D 35,040
9 Claims. (Cl. 260—92.8)

The present invention relates to a process of preparing polyvinylchloride and mixed polymerizates of vinylchloride and more particularly relates to a process of preparing such polymerizates using as catalyst for the polymerization an activated and stereo-specific acting catalytic system, including a metal organo compound.

Processes for the polymerization of vinyl compounds utilizing metal organo compounds and in particular metal alkyls to accelerate the polymerization reaction are known. It has been established that the catalytic effect of the metal organo compounds when used alone as the sole catalytic agent in the polymerization of vinylchloride or in the mixed polymerization of vinylchloride with other vinyl compounds is generally very low and, therefore, the use of the metal organo compounds alone as catalyst is impractical for economical reasons.

It has already been proposed to enhance the catalytic effect, i.e., increase the polymerization velocity by introduction of small quantities of oxygen into the vinylchloride polymerization mixture in which there is already present a metal alkyl as catalyst.

In the aforesaid processes the yields of polymerizate are substantially increased, but the process has the disadvantage that the dosaging of the oxygen is quite difficult. Furthermore, the co-catalytic effect of the oxygen depends on the filling of the polymerization vessel, the speed of stirring of the polymerization mixture, and the duration of the action, and, above all, on the temperature. It has already been proposed to use in place of the oxygen, oxygen-liberating compounds as, for example, inorganic or organic peroxides of hydroperoxides, the same permitting a simpler and better regulated dosaging. The oxygen-liberating compounds are characterized in that their accelerating effect is manifested at temperatures above 0° C.; their effect as co-catalytic agents is very inefficient at lower temperatures and, therefore, for most purposes, impractical.

It has now surprisingly been found, in accordance with the invention, that the preparation of vinylchloride polymers and copolymers in the presence of metal organo compounds may be most advantageously carried out if in the polymerization reaction, in addition to the metal organo compound, there is present an $\alpha$-halogen ether. When the aforesaid catalyst combination of a metal organo compound and an $\alpha$-halogen ether is applied, the polymerization velocity is substantially increased and a polymer having favorable properties in excellent yields is obtained. In accordance with the invention, as metal organo catalyst there may be used an organo compound of a metal of the third main group or of the second and fourth sub-groups of the periodic system of elements. Specifically advantageous, as metal organo compound, are zinc, boron, aluminum, arsenic, antimony, alkyl, aryl alkyl and aryl compounds.

Instances of $\alpha$-halogen ethers which may be used as co-catalysts in accordance with the invention include $\alpha$-chloro- and $\alpha$-bromodiethylether, $\alpha,\beta$-dichloro- and $\alpha,\beta$-dibromo-diethylether, $\alpha,\beta,\beta'$-trichloro-diethylether, among others. It has been established that the $\alpha$-halogen atom is essential to achieve the acceleration of the polymerization velocity and that an ether per se, i.e. diethyl ether or a $\beta$- or $\beta,\beta'$-substituted halogen ether used in combination with the metal organo catalyst is totally, or substantially totally, ineffective for accelerating the polymerization reaction.

The quantity of $\alpha$-halogen ether required for use in combination with a metal organo compound to favorably accelerate the polymerization is very slight and amounts within the range of 0.05 to 1%, referred to the monomer or monomers sufficing in this regard. The optimal quantity to be used in carrying out the invention varies in dependence on the $\alpha$-halogen ether and the metal organo compound selected as catalytic agents. Generally the mol ratio of $\alpha$-halogen ether to metal organo compound employed is not greater than 1.

The addition of the $\alpha$-halogen ether to the polymerization mixture is preferably conducted so that immediately at the start of the polymerization, the entire quantity of $\alpha$-halogen ether required for promoting the polymerization is added. However, it is also possible to divide the quantity of $\alpha$-halogen ether into smaller amounts and to add the same in small increments over the course of the polymerization reaction to thereby obtain the promoting effect.

The polymerization may be effected in the usual manner at a temperature of between about —40 to +10° C. and preferably at a temperature of between —20 to 0° C.

The polymerization reaction in accordance with the invention may be carried out in bulk and in solution—i.e., in the presence of a solvent for the monomer. The solvent for the monomer, however, does not also have to be a solvent for the polymerization product formed.

The following examples are illustrative of the invention but are not intended nor are they to be construed as a limitation thereof.

Example 1

100 g. vinylchloride are introduced into a glass vessel provided with a stirrer under oxygen-free nitrogen. The temperature in the reaction vessel is maintained at —18° C. 0.3 g. borontributyl and 0.1 ml. $\alpha,\beta$-dichlorodiethyl ether dissolved in 5 ml. petroleum ether are added to the vinylchloride. Immediately after addition of the $\alpha$-halogen ether, a turbidity of the reaction solution occurs, indicating the start of polymerization. After 2 hours the polymerization reaction is interrupted by addition of ammonia-containing methanol and the polymerizate recovered and worked up. The yield of polymerizate obtained amounts to 5.1 g. The product has a K value (Fickentscher) in cyclohexanone of 107 and a non-deformability according to Vikat of 109° C.

If the same reaction is carried out but without the addition of $\alpha,\beta$-dichlorodiethyl ether, then there is obtained after 2 hours 1.0 g. polymerizate.

If, instead of the $\alpha,\beta$-dichlorodiethyl ether, $\beta,\beta'$-dichlorodiethyl ether is used, the polymerization product obtained in 2 hours amounts to 0.8 g. and if, in place of the $\alpha$-halogen ether, an equivalent amount of diethyl ether is utilized in the otherwise identical reaction, there is obtained only 0.9 g. of polymerization product in the same polymerization period.

Example 2

Example 1 is repeated using the same starting quantities of vinylchloride and borontributyl but, in place of the $\alpha,\beta$-dichlorodiethyl ether there is added 0.1 ml. $\alpha$-chlorodiethyl ether. The yield of polymerization product after 2 hours amounts in this instance to 5.8 g., said product having a K value of 103 and a non-deformability value, according to Vikat, of 110° C.

Example 3

100 g. of vinylchloride are worked up as in Example 1. 0.1 ml. borontri-i-octyl and 0.18 ml. of α,β,β'-trichlorodiethyl ether, dissolved in 5 ml. petroleum ether, are added to the vinylchloride. The polymerizate recovered after 2 hours amounts to 3.4 g. The product has a K value of 98 and a non-deformability value (Vikat) of 111° C.

A similar run carried out under the same conditions but without addition of any α-halogen ether results in recovery of 0.3 g. polymerization product in 2 hours.

Example 4

Example 1 is repeated using again the same starting amounts of vinylchloride and borontributyl. 0.09 ml. α,α'-dichlorodiethylether, dissolved in 5 ml. benzene, are added to the polymerization mixture. After 2 hours the yield of polymerization product recovered amounts to 3.4 g. The product has a K value of 101 and a non-deformability value (Vikat) of 111° C.

Example 5

100 g. of vinylchloride are worked up substantially as in Example 1. There are added to vinylchloride 0.38 ml. dibutyl phenyl boron and 0.17 ml. α,β-dichlorodiethyl ether. There is recovered after 2 hours 1.1 g. of polymerization product. When the example is carried out under otherwise similar conditions but without addition of α-halogen ether, no polymerization is seen to occur.

Example 6

100 g. of vinylchloride are worked up in the manner described in Example 1. 0.5 ml. aluminum-triethyl and 0.2 ml. α,β-dichlorodiethylether, dissolved in benzene, are added to the vinylchloride. After 2 hours 1.1 g. of polymerization product are recovered. If the run is carried out without any addition of α-halogen ether but, under otherwise similar reaction conditions, no polymerization occurs.

Example 7

100 g. of vinylchloride are processed as set out in Example 1. There are added to the vinylchloride 1 g. antimony-tributyl and 0.3 g. α,β-dichlorodiethylether dissolved in 5 ml. benzene. The polymerization commences immediately as evidenced by an immediate turbidity of the polymerization mixture. After 1 hour 4.6 g. of polymerization product are recovered. The polymerization product has a K value of 87 and a non-deformability value (Vikat) of 109° C. When the run is carried out without any α-halogen ether but under otherwise similar reaction conditions, no polymerization is seen to occur.

Example 8

To 100 g. of vinylchloride as processed in Example 1, there are added 0.3 g. zinc-diethyl and thereafter 0.05 g. α-chlorodiethylether, dissolved in 5 ml. benzene. Immediately after addition of the α-chloro-ether, turbidity sets in, indicating the start of the polymerization reaction. After 2 hours there is obtained 2.1 g. of a polymerizate having a K value of 89 and a non-deformability value, according to Vikat, of 103° C. When the reaction is carried out without the addition of α-chloro ether, there is obtained under otherwise similar conditions only 0.4 g. polymerizate in 2 hours.

I claim:

1. The process of preparing vinylchloride polymerization products which comprises homopolymerizing vinylchloride with a catalyst comprising a mixture of two components B and A, B is a metal organo compound selected from the group consisting of boron, aluminum, scandium, yttrium, lanthanum antimony, bismuth, zinc, cadmium and mercury alky and aryl compounds and A is an α-halogen ether, wherein the halogen portion is a member selected from the group consisting of chlorine and bromine, under polymerizing conditions including a temperature of from about −40 to +10° C., and wherein said α-halogen ether is present in an amount of 0.05 to 1% referred to the monomer, and the molar ratio of $A:B$ is less than 1, and recovering the vinylchloride polymerization products so produced.

2. Process according to claim 1 wherein said polymerizing is effected at a temperature of between about −20 to 0° C.

3. Process according to claim 1 wherein said α-halogen ether is a member selected from the group consisting of α-chlorodiethyl ether, α-bromodiethyl ether, α,β-dichlorodiethyl ether, α,β-dibromodiethyl ether, α,β,β'-trichlorodiethyl ether, and α,α'-dichloroethyl ether.

4. Process according to claim 1 wherein said metal organo compound is boron tributyl and said α-halogen ether is α,β-dichlorodiethyl ether.

5. Process according to claim 1 wherein said metal organo compound is boron tri-i-octyl, and said α-halogen ether is α,β,β'-trichlorodiethyl ether.

6. Process according to claim 1 wherein said metal organo compound is dibutylphenyl boron, and said α-halogen ether is α,β-dichlorodiethyl ether.

7. Process according to claim 1 wherein said metal organo compound is aluminum triethyl and said α-halogen ether is α,β-dichlorodiethyl ether.

8. Process according to claim 1 wherein said metal organo compound is antimony tributyl and said α-halogen ether is α,β-dichlorodiethyl ether.

9. Process according to claim 1 wherein said metal organo compound is zinc diethyl and said α-halogen ether is α-chlorodiethyl ether.

References Cited by the Examiner

UNITED STATES PATENTS 2,935,500   5/60   Nowlin et al.
3,052,661   9/62   Benning _____ 260—89.1

FOREIGN PATENTS 566,532   10/58   Belgium.
1,041,959   10/58   Germany.

JOSEPH L. SCHOFER, *Primary Examiner.*

H. N. BURSTEIN, J. R. LIBERMAN, *Examiners.*